US010147291B2

(12) United States Patent
Tarcisio Caddah

(10) Patent No.: US 10,147,291 B2
(45) Date of Patent: Dec. 4, 2018

(54) SYSTEM AND METHOD FOR PROTECTING RESTRICTED-ACCESS AREAS AGAINST INTRUSIONS BY PEDESTRIANS AND/OR NON-CAB VEHICLES IN GENERAL, WITH ACCESS PERMITTED FOR VEHICLES WITH A CAB, INCLUDING CONVERTIBLE VEHICLES WITH CLOSED TOP

(71) Applicant: Melo Tarcisio Caddah, Rio de Janeiro (BR)

(72) Inventor: Melo Tarcisio Caddah, Rio de Janeiro (BR)

(*) Notice: Subject to any disclaimer, the term of this patent is extended or adjusted under 35 U.S.C. 154(b) by 0 days.

(21) Appl. No.: 15/311,157

(22) PCT Filed: May 15, 2014

(86) PCT No.: PCT/BR2014/000158
§ 371 (c)(1),
(2) Date: Nov. 14, 2016

(87) PCT Pub. No.: WO2015/172209
PCT Pub. Date: Nov. 19, 2015

(65) Prior Publication Data
US 2017/0076574 A1 Mar. 16, 2017

(51) Int. Cl.
*B60R 25/00* (2013.01)
*G08B 15/00* (2006.01)
(Continued)

(52) U.S. Cl.
CPC ........... *G08B 15/005* (2013.01); *G08G 1/015* (2013.01); *E05G 5/00* (2013.01); *E05G 7/00* (2013.01)

(58) Field of Classification Search
CPC ...... G08B 15/00; G08B 15/005; A01M 29/00; G07C 9/00
See application file for complete search history.

(56) References Cited

U.S. PATENT DOCUMENTS 3,230,518 A * 1/1966 Vassil .................... G08B 13/26 327/517
3,611,341 A * 10/1971 Craig .................... G08B 13/20 174/9 F (Continued)

FOREIGN PATENT DOCUMENTS

NL 9200107 A 8/1993
WO WO 2006/093527 A1 9/2006

OTHER PUBLICATIONS

International Search Report issued by Instituto Nacional DA Propriedade Industrial dated Jan. 15, 2015 in the corresponding PCT Application No. PCT/BR2014/000158—5 pages.

*Primary Examiner* — Joseph Feild
*Assistant Examiner* — Rufus Point
(74) *Attorney, Agent, or Firm* — The Marbury Law Group, PLLC

(57) ABSTRACT

Disclosed is a power supply provides electric power—with appropriate voltage and amperage for the planned use—to supports—that can be shielded electrical materials—wherefrom flexible, charged conductors exit. These may be disposed exiting from lower supports in the ground, or from the supports of one or both sides of lateral and/or upper structures delimiting the entry/exit locations of the restricted access area and having dimensions and shapes most suitable to the specific use intended. This system renders it possible to prevent pedestrian and/or vehicles in general without a cabin from accessing the area, with access allowed to vehicles with a cabin, including convertible vehicles with a closed hood, although simultaneously or immediately before or after the passage of authorized vehicle(s), preventing intrusions, invasions, assaults etc. to the restricted access area.

15 Claims, 2 Drawing Sheets

(51) Int. Cl.
*G08G 1/015* (2006.01)
*E05G 7/00* (2006.01)
*E05G 5/00* (2006.01)

(56) References Cited

U.S. PATENT DOCUMENTS 3,794,992 A * 2/1974 Gehman ................... G01S 1/02 340/539.1
3,806,908 A * 4/1974 Bound ................... G01V 1/201 340/525
3,806,909 A * 4/1974 Bound ................... G08B 13/10 310/330
3,891,900 A * 6/1975 Gallant ................... G07C 9/00 361/167
4,047,166 A * 9/1977 Miller ................... G01V 1/208 174/110 R
4,053,877 A * 10/1977 Torlesse ............. G08B 13/2497 340/552
4,091,367 A * 5/1978 Harman ............. G08B 13/2497 333/237
4,326,272 A * 4/1982 Rittenbach .............. G01S 13/56 181/123
4,400,695 A * 8/1983 Rittenbach .............. G01S 13/56 181/122
4,415,885 A * 11/1983 Mongeon ........... G08B 13/2497 340/552
4,488,040 A * 12/1984 Rowe ................... G08B 13/126 250/227.14
4,612,536 A * 9/1986 Harman ............. G08B 13/2497 333/237
4,699,197 A * 10/1987 Hamrick ............... E05F 15/605 160/188
4,751,514 A * 6/1988 Sheriff ..................... H01Q 1/32 343/713
4,792,804 A * 12/1988 Rubechini ................ G01V 3/12 340/561
5,247,270 A * 9/1993 Harman ............... H01Q 13/203 174/36
5,311,166 A * 5/1994 Frye ....................... G08B 15/00 109/20
5,446,446 A * 8/1995 Harman ............... G08B 13/169 340/566
5,576,627 A * 11/1996 McEwan ............... G01F 23/284 324/639
6,437,740 B1 * 8/2002 De Champlain ....... G01S 7/292 342/153
6,933,843 B1 * 8/2005 Hom ........................ G07C 3/00 340/545.1
6,937,151 B1 * 8/2005 Tapanes ............... G08B 13/124 250/227.19
7,014,147 B2 * 3/2006 Egeresi ................. B60R 25/018 244/118.5
7,259,669 B2 * 8/2007 Cargonja .............. B60R 25/104 340/539.1
8,179,149 B1 * 5/2012 Holly ................. G08B 13/2497 324/629
8,686,831 B2 * 4/2014 Green ................. G07C 9/00111 340/10.1
2001/0024049 A1 * 9/2001 Ramirez, Jr. .......... B60J 7/1226 296/107.01
2003/0112123 A1 * 6/2003 Hom .................... G05B 19/042 340/5.65
2005/0168321 A1 * 8/2005 Fitzgibbon ............... G07C 9/00 340/5.53
2006/0047448 A1 * 3/2006 Cecil .................. G08B 13/2454 702/59
2008/0308780 A1 * 12/2008 Sloan ...................... E01F 13/12 256/31
2009/0109026 A1 * 4/2009 Thompson ............... H05C 1/04 340/564
2009/0310286 A1 * 12/2009 Miller .................... F16M 11/42 361/679.01
2010/0265066 A1 * 10/2010 Edelman ............... A01M 29/00 340/541
2013/0304415 A1 * 11/2013 Bomparet .............. G08B 13/12 702/150
2014/0375453 A1 * 12/2014 Chamoux ............ G08B 13/122 340/541
2015/0285705 A1 * 10/2015 Kumar ................ G01M 5/0025 356/73.1
2016/0328961 A1 * 11/2016 Garces Cadenas .... G01V 3/081

* cited by examiner

SYSTEM AND METHOD FOR PROTECTING RESTRICTED-ACCESS AREAS AGAINST INTRUSIONS BY PEDESTRIANS AND/OR NON-CAB VEHICLES IN GENERAL, WITH ACCESS PERMITTED FOR VEHICLES WITH A CAB, INCLUDING CONVERTIBLE VEHICLES WITH CLOSED TOP

BACKGROUND OF THE INVENTION

Field of the Invention

The present Patent of Invention Application relates to a device and a method for preventing the entrance of intruders into places having access restricted for pedestrians and vehicles in general without a cabin, with access allowed for vehicles with a closed or partially open cabin, including convertible vehicles with hood closed.

Description of the Related Art

The protection of buildings, constructions, plants, houses, lands, military facilities, mansions and other restricted access areas in general has been an increasing and hard-to-solve problem.

The use of bars and barbed wire fences has been proven not to be enough to hold the wave of intrusions, assaults and invasions even into Armed Forces facilities, including the occurrence of theft of weapons and death of people who thought themselves to be safe from such events.

Adding cameras, even night-vision cameras, electrifying existing fences, installing alarms, as well as a panoply of other means currently available, along with reinforcement of the surveillance personnel, have been implemented as a way to reduce the risk of invasions, having had diminutive results, always of limited scope.

The fragility in guarding the access to restricted places increases during the entrance and exit of authorized people. Numerous assaults unleash on the moment the access, previously obstructed, is cleared to residents, visitors, suppliers and other authorized people, the intruders taking advantage of the temporary suspending of the protections for access into such restricted places, thus performing the unauthorized entrance and fulfilling the assaults and invasions.

Such vulnerability greatly increases in case of access of authorized people using vehicles. There are virtually countless occurrences recorded in which the assaulters take action while the entrance or exit is granted to vehicles transporting authorized people, generally after some kind of their prior identification.

In fact, almost everyday news are published, in the spoken, written press and/or broadcast, about this kind of incident, most of the time specifying such criminal events occur while the gates in such restricted access places are opened to grant passage to authorized vehicles entering and exiting.

The prevention of such incidents imposes the use of a great contingent of people prepared for such eventualities, as well as other means, thus involving the deployment of significant recourses and structures, which causes high expense.

TECHNICAL PROBLEM

Therefore, there is an uttermost need regarding security, generally and particularly speaking, that the restricted access areas are accessed only by authorized personnel using vehicles with a closed or partially open cabin, without it being possible to occur, simultaneously or immediately before or after, the unauthorized entrance of one or more people on foot and/or in vehicles without a cabin, even heavily armed.

There is also a relevant need that the means involved in a potential solution for such a problem are relatively inexpensive.

There is also a relevant need that the means involved in a potential solution for such a problem are relatively simple.

There is also an important need that the devices used to solve such a problem operate continuously in any weather conditions.

It is also essential that the physical resources employed are capable of operating efficiently in case of a fault or shutdown in the electric power supply.

There is also a significant need that the means used can operate likewise during the day and at night.

PRINCIPLE OF THE INVENTION

The present invention was designed based on the concept of the Faraday cage, which explains that the energy loaded into a conductive structure spreads externally thereon, such as a cabin, closed or partially open, of the huge majority of the motorized vehicles.

Among important applications is the protection of houses, buildings, homes and stadiums, which uses lightning rods and a mesh that conducts the electric power to the ground in the soil, thus avoiding potential damage caused by atmospheric discharges to such constructions. This kind of protection is commonly called SPDA (Atmospheric Discharge Protection System).

Other outstanding application of the Faraday cage concept consists of the use of frameworks which house electronic equipment in order to prevent electromagnetic interferences of one apparatus with the others.

SUMMARY OF THE INVENTION

The present invention has been designed in order to prevent the unauthorized entrance of intruders—also during the sensitive times of entrance and/or exit of authorized personnel transported inside vehicles with a closed or partially open cabin (cars, trucks, buses, vans, utilities, tricycles having a closed or partially open cabin etc.)—into/from a restricted access space.

Searches conducted referring to the particular subjects did not detect any anteriorities.

BRIEF DESCRIPTION OF THE DRAWINGS

The devices according to the present invention are concisely depicted in the accompanying drawings, in which.

DETAILED DESCRIPTION OF THE INVENTION

Figure 1:
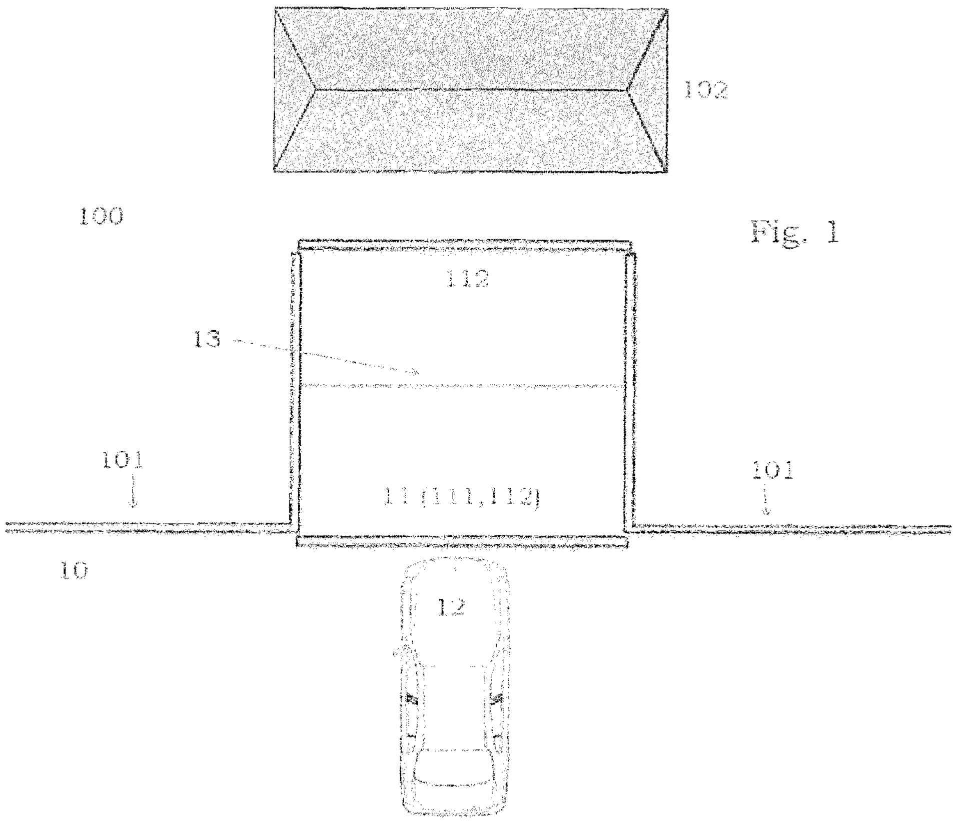
FIG. 1 shows a closed-cabin vehicle approaching a restricted access place.
Figure 2:
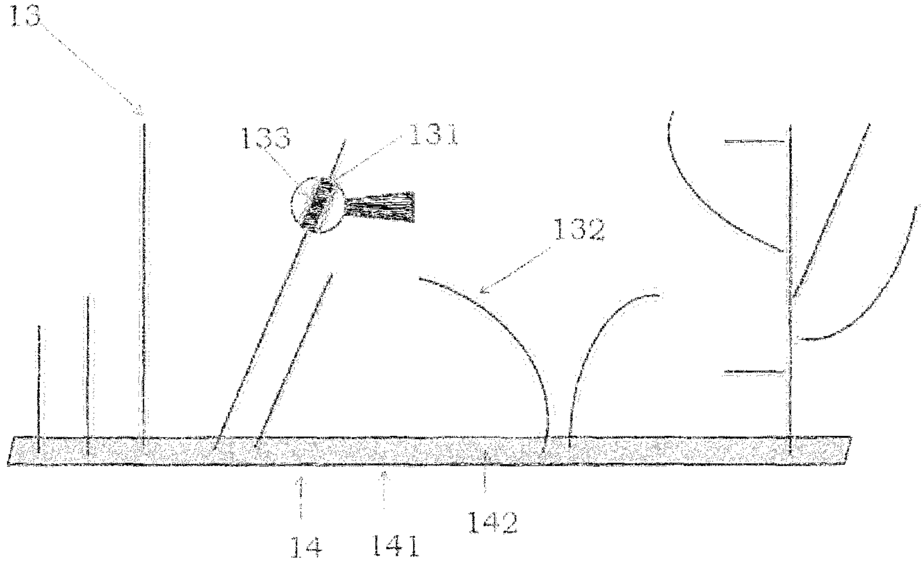
FIG. 2 depicts different kinds of conductors set on brackets, all of them used in the present invention.

The present invention relates to devices and corresponding methods applied in order to prevent the entrance and/or exit of unauthorized personnel into/from restricted access areas, simultaneously and/or immediately before or after a movement of entrance and/or exit of authorized personnel transported inside vehicles with a cabin, closed or partially open; or at any time.

In the present Patent of Invention Application, the following definitions are used:

a) restricted access areas 10—it refers to bounded surfaces 100, i.e., defining a closed area, of any size or shape, or open in one or more sides, with or without buildings therein; they can be both public or private, wherein the entrance and/or exit is allowed only to certain personnel, transported inside vehicles; that is, it is intended to avoid the entrance on foot by unauthorized people and/or vehicles without a cabin—i.e., to prevent intrusions, invasions, assaults etc.; the present invention does not require for its functioning and/or application that the restricted access areas are bounded by permanent protections, such as walls, fences etc., it being possible for it to be just a closed area land; or open in one or more sides; with or without constructions therein;

b) movement of entrance/exit—act of entering/exiting a restricted access area;

c) entrance/exit 11—a place where the movement of entrance/exit of authorized personnel, transported inside vehicles with a closed or partially open cabin by means of a temporary, intended deactivation of physical blockages (gates, traffic arms etc.), if any, happens; the physical blockages can be made in one piece (a gate, for instance) or two parts, which allow the entrance or exit with the cloistering of the vehicle, keeping the isolation of the space 10 in relation to the outside;

e) vehicles with a closed or partially open cabin, 12—it refers to vehicles provided with a closed space or housing, where authorize personnel can stay; such is the case, for instance, of passenger cars, vans, buses, tricycles with a cabin, closed or partially open, trucks and utilities (without people inside the dumpster), tractors with a cabin, closed or partially open; excluding motorcycles, vehicles without a housing such as tractors without a cabin, tricycles without a cabin and the like;

f) conductors 13—flexible electrically conductive elements having a core 131 made of plastic or other materials, which:

f1) in the absence of an external force 132, remain spontaneously in an initial or stand-by physical position;

f2) are provided with physical proprieties of flexibility, thus allowing that, by action of an external force 132, they move away from the stand-by or initial position and bend or fold themselves, returning, thereafter, to the initial position, when the action of the external force 132 is ceased; and f3) are covered by metal layer(s) 133 or other conductive metal materials (such as copper, aluminium etc.) or other non-metal electrically conductive materials, which allow the transmission of electric current; and g) brackets 14: holders made of:

g1) a resistant insulating material or a resistant material having isolators 141, which have electrically conductive materials going internally through it; or g2) a resistant non-insulating material, which have sheathed electrically conductive materials going internally through it; or g3) sheathed electrically conductive materials, which are place in the soil and/or side and/or upper structures which delimit the places of entrance/exit 11 and from where the conductors 13 come out; and which allow the transmission of electric current from a power supply—which can be a public network or supplemental and/or alternate sources, such as generators, no-breaks etc.—to the conductors 13, which then become empowered.

In order to carry out the present invention, the restricted access areas 10 are surrounded along all their borders 100 or only in places of entrance/exit 11, using brackets 14, provided with conductors 13, all of them connected in series or in parallel to the power supply.

In an embodiment of the invention, the conductors 13 are equal, linear and have a length typically in the range of 1-3 meters, which can vary beyond these values, to embody configurations more convenient to a particular place.

In another embodiment of the invention, the conductors 13 are all bent.

In another embodiment of the invention, the conductors 13 are all in a zigzag pattern.

In another embodiment, the conductors 13 are of different shapes, including dendritic conductors.

In another embodiment, the conductors 13 are of different shapes and sizes, including dendritic conductors.

In another embodiment, the conductors 13 are of different shapes and sizes, including dendritic conductors.

In an embodiment of the invention, the brackets 14 are made of a continuous insulating base—for instance, porcelain, ceramics, non-conductive plastics etc.—provided at intervals of 5-20 centimetres—or other more convenient distances, according to the particular circumstances—in places 142 where the conductors 13 get out, properly isolated, including from contact with the soil, and with a sealing, which prevents the entrance of water or other elements. Inside them, the electric cable runs which connects to each one of the exiting conductors 13.

In an embodiment of the invention, the brackets 14 are composed of a continuous non-isolated basis—for instance, of metal or other conductive material etc.—sheathed electric cable, provided at intervals of 5-20 centimetres—or other more convenient distances, according to the particular circumstances—of places 142 where the conductors 13 get out, properly isolated, including from the contact with the soil, and with a sealing which prevents the entrance of water or other elements. Inside them, an electric cable runs, which connects to each one of the exiting conductors 13.

In another embodiment, the brackets 14 are composed of an isolated electric cable, provided at intervals of 5-20 centimetres—or other more convenient distances, according to the particular circumstances—of places 142 where the conductors 13 get out, properly isolated and with a sealing which prevents the entrance of water or other elements.

In another embodiment, non-insulating brackets 14 are disposed in places of entrance/exit (11) of the restricted access area (10), and can be placed grounded in the soil.

Figure 3:
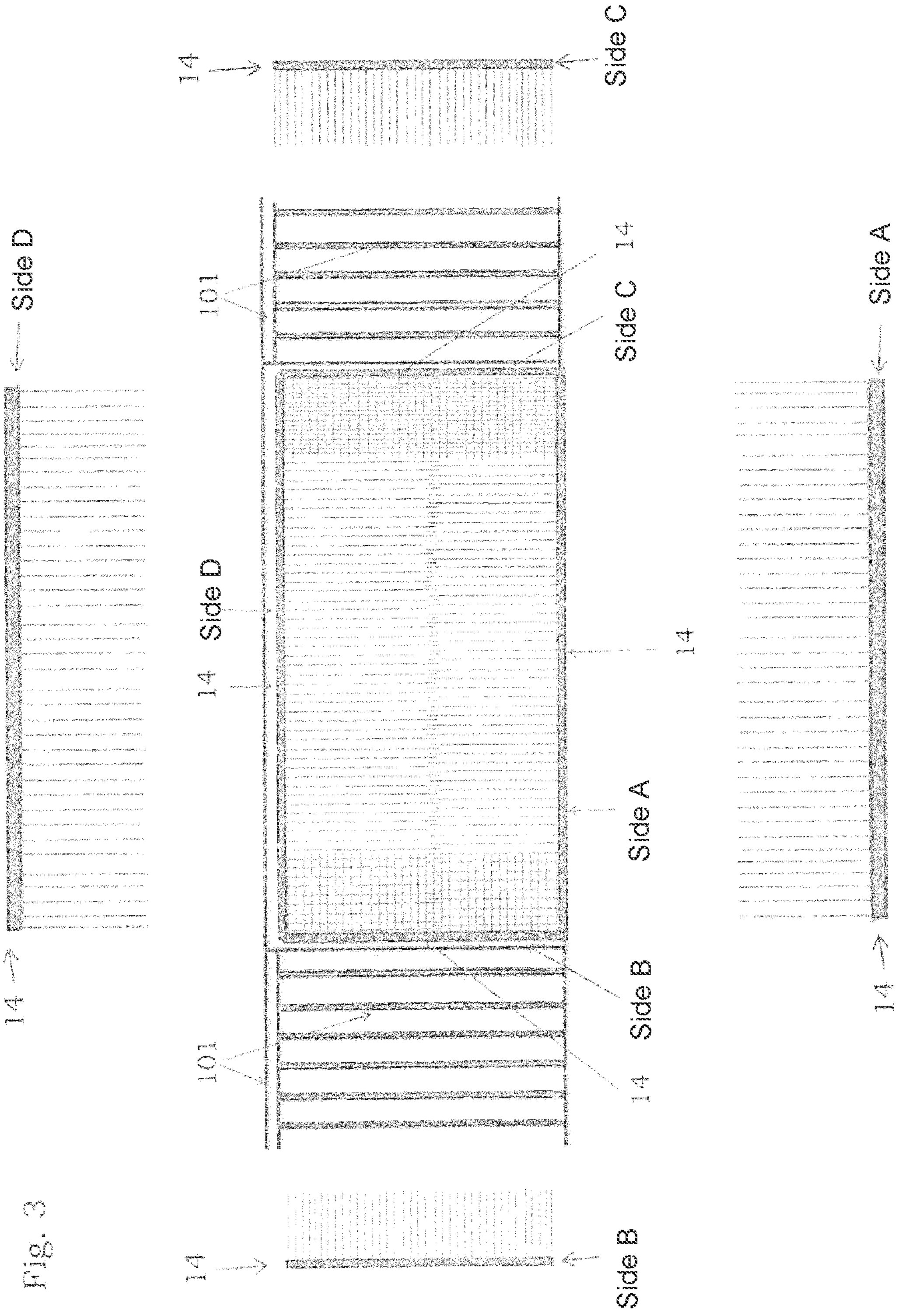
FIG. 3 corresponds to a combined view and an exploded view of the conductors and brackets used in the invention, as applied to the entrance of the restricted access place.

In another embodiment of the invention, the set of brackets 14 which bound the places of entrance/exit 11 is disposed in structures—see FIG. 3—provided on one side (either A or B or C or D) of the entrance (11).

In another embodiment of the invention, the brackets 14 are disposed in structures—see FIG. 3—provided on two sides (A and B, A and C, A and D, B and C, B and D etc.) of the entrance 11.

In other embodiments of the invention, the brackets 14 can be disposed simultaneously in three or all of the sides—see FIG. 3:

a) on the upper portion D and on both sides B and C of the entrance 11, for instance; or b) on the soil A, on both sides B and C and on the upper portion D of the entrance 11.

For each of these variants, the conductors 13 can be of shapes considered more convenient, in such a way as to build a tightened mesh surface.

Present invention works as described below:

when one or more vehicles get close to the places 11 of entrance/exit in the restricted access area 10, a) if there is a physical blockage in the entrance/exit 11, composed of a gate, traffic arm, moveable fence etc.:

a1) once the authorized personnel, transported inside the vehicles with a closed or partially open cabin are visually recognized or by other means and the entrance is granted, the physical blockage of the entrance/exit 11 is removed, either by moving it upward, sliding it sideways or by other means, leaving the conductors 13 exposed and laid across the way of the vehicle(s) entering or exiting. In some embodiments, the same result can be achieved using remote controls. Such conductors are electrically charged, since they are attached to the brackets 14, connected to a power supply, and have a consistency and flexibility enough to bent from one side to the other under the contact of the vehicle(s) which enter or exit the restricted access area 10;

a2) while the vehicle(s) pass(es) through the mesh of conductors 13, the attempt of any intruder(s) to take advantage of the opportunity of the passage of the vehicle(s), either simultaneously or before or after them, while the physical blockage of the entrance/exit of the restricted access area 10 is deactivated for a moment, it will result in that they will get an electrical discharge, which will inactivate them, thus preventing the intrusion. The authorized personnel transported inside the vehicle(s) will not suffer anything;

b) if there is not any physical blockage in the entrance/exit 11 (composed of a gate, traffic arm, moveable fence etc.):

b1) everything will occur such as in step (a2), now, without the step of recognizing the authorized personnel or activating by remote control from inside the vehicle(s).

In other words, the invention will function with or without the existence of a physical blockage. Such physical blockage, in fact, is only convenient to avoid incidents involving unadvertised people, children, animals, blind people etc. who would inadvertently want to get inside the restricted access area 10. Actually, this is an element, which does not belong to the invention.

It should be emphasized that, even if intruder(s), seeking to nullify the effect of the invention, wore shoes made of rubber or other insulating materials, they would not be able to avoid the electrical discharge, when touching any of the flexible conductors 13.

In an embodiment, such conductors 13 are supplied by a low voltage and high amperage.

In another embodiment, such conductors 13 can be supplied by a voltage and amperage according to the details convenient to the respective particular application.

Upon the movement of entering or exiting of the vehicle(s), the conductors 13 will return from their bent positions to the their initial position. Such is, in principle, a vertical or near vertical position, but, depending on the particular place convenience, it could be any other. It could even be a horizontal position, when the conductors 13 are applied, for instance, on a wall, not on the upper portion, but on the side portion, along with other conductors on the upper portion or not.

The blockage of the entrance/exit 11, in the embodiments where it exists, can be returned to the closed position, thus preventing the movement in general. The respective activation can be done by devoted personnel or by remote control.

Present invention was described concerning its general aspects. The description should not be construed as limiting. A person skilled in the related art could readily adjust new devices or schemes, which, by applying the invention principle, would not depart from respective scope.

Thus, the particular components, structures, steps or features of the embodiments discussed herein can be combined in any appropriate manner in one or more separate embodiments.

It is intended, therefore, that the scope of the embodiments described is not limited by the specific forms of embodiment described above, but is determined by the correct reading of the Claims as follows.

What is claimed is:

1. A system of protecting a restricted access area, comprising:

a) a conductor, which is an electricity conductive flexible element, comprising a core coated with a conductive metal layer, wherein the conductor curves or bends by an external force when the external force is applied to the conductor, and wherein the conductor returns to an original shape when the application of the external force to the conductor is ceased;

b) a support comprising an electric cable, wherein the conductor is attached to the support and connected to the electric cable such that an electric current passes through from the electric cable to the conductor;

c) a power supply providing the electric current to the electric cable of the support; and d) two support rods with grounded conductors, located before and/or after the support, wherein the grounded conductors are configured to discharge residual electricity of a vehicle after passing through the support.

2. The system of protecting the restricted access area according to claim 1, comprising two or more said conductors, wherein lengths of the conductors are substantially equal each other, and wherein the lengths of the conductors are in a range of 1-3 meters.

3. The system of protecting the restricted access area according to claim 1, wherein the support comprises an insulating material shielding the electric cable such that the insulating material prevents entry of water or other elements into the electric cable.

4. The system of protecting the restricted access area according to claim 1, wherein the support is buried underground at the entry/exit location of the restricted access area.

5. The system of protecting the restricted access area according to claim 1, wherein the electric cable is shield by an insulating material to prevent electric current leak, water and/or other external factors, and wherein the electric cable directly connected to the conductor.

6. A method of protecting a restricted access area, comprising:

a) protecting the restricted access area by the system of claim 1;

b) blocking a vehicle at an entry/exit location of the restricted access area by a physical blockage, waiting for a recognition of an authorized person and an approval of admission or triggering a remote controller available within the vehicle;

c) removing the physical blockage at the entry/exit location either by moving the physical blockage upward or sliding the physical blockage sideways to allow the vehicle to pass the entry/exit location of the restricted access area when the approval is generated by the authorized person or the remote controller is triggered to remove the physical blockage at the entry/exit location.

7. The system according to claim 1, wherein the core is a plastic material.

8. The system according to claim 1, wherein the support is placed on a soil at the entry/exit location.

9. The system according to claim 1, wherein the conductive metal layer is selected from the group consisting of copper and aluminum.

10. The system according to claim 1, wherein the power supply is a public network or a supplemental source including a generator or no-breaks.

11. The system according to claim 1, wherein a shape of the conductor is selected from the group consisting of a linear, a curved line and a zigzag shape.

12. The system according to claim 1, wherein the support is constructed by a side A which is a bottom structure, sides B and D which are lateral structures, a side C which is a upper structure at the entry/exit location.

13. The system according to claim 3, comprises two or more said supports, wherein the supports are provided at 5-20 cm intervals in the restricted access area.

14. The system according to claim 6, wherein the support encircles only the entry/exit location in the restricted access area.

15. The system according to claim 6, wherein the physical blockage is selected from the group consisting of a gate, a traffic arm and a movable fence.

* * * * *